United States Patent [19]
Terai et al.

[11] Patent Number: 6,038,728
[45] Date of Patent: Mar. 21, 2000

[54] WIPER ARM AND WIPER DEVICE FOR VEHICLE

[75] Inventors: Tadayoshi Terai, Kosai; Yoshinori Hitomi; Masayuki Okano, both of Toyota; Kazutoshi Kinoshita, Nagoya, all of Japan

[73] Assignees: Asmo, Co., Ltd., Shizuoka-pref; Toyota Jidosha Kabushiki Kaisha, Aichi-ken, both of Japan

[21] Appl. No.: 09/123,950

[22] Filed: Jul. 28, 1998

[30] Foreign Application Priority Data

Jul. 29, 1997 [JP] Japan ........................................ 9-20779
Jul. 29, 1997 [JP] Japan ........................................ 9-202780

[51] Int. Cl.$^7$ ...................................................... B60S 1/34
[52] U.S. Cl. ................................ 15/250.201; 15/250.351
[58] Field of Search ...................... 15/250.351, 250.352, 15/250.04, 250.201, 250.19, 250.202, 250.21

[56] References Cited

U.S. PATENT DOCUMENTS

| | | | |
|---|---|---|---|
| 3,525,114 | 8/1970 | Smith | 15/250.19 |
| 3,670,354 | 6/1972 | Weber | 15/250.351 |
| 5,564,158 | 10/1996 | Bauer et al. | 15/250.351 |

FOREIGN PATENT DOCUMENTS

| | | | |
|---|---|---|---|
| 2632897 | 12/1989 | France | 15/250.351 |
| 47-21835 | 10/1972 | Japan . | |
| 59-66652 | 5/1984 | Japan . | |
| 293256 | 11/1989 | Japan | 15/250.201 |

*Primary Examiner*—Gary K. Graham
*Attorney, Agent, or Firm*—Fish & Richardson P.C.

[57] ABSTRACT

A wiper arm for a vehicle windshield includes an arm head to be rotatably connected to a driving motor mounted in a vehicle, a spring member, a retainer pressed against the windshield by the spring member, a wiper blade supported by the retainer. The retainer has a channeled structure tapering to the wiper blade and is composed of an upper wall, a first side wall extending from one side of the upper wall, a second side wall extending from the other side of the upper wall to be located at a downstream side on the windshield relative to the first side wall and an open side disposed opposite the upper wall to face the windshield. The first side wall has a larger height from the upper wall than the second side wall.

17 Claims, 7 Drawing Sheets

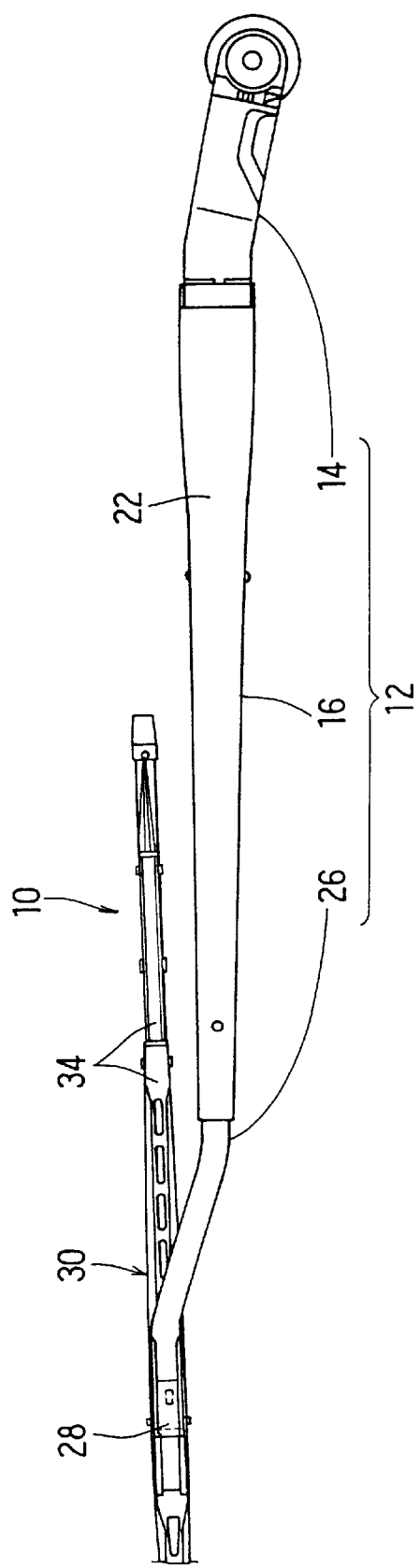
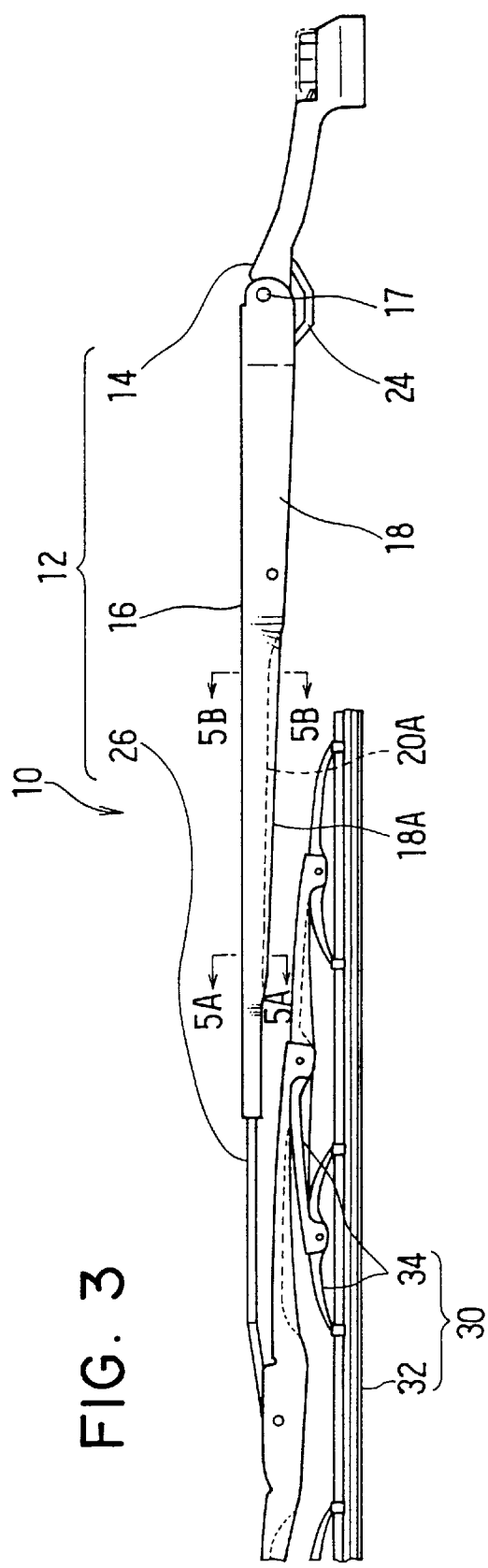

WIPER ARM AND WIPER DEVICE FOR VEHICLE

CROSS REFERENCE TO RELATED APPLICATION

The present application is based on and claims priority from Japanese Patent Applications Hei 9-202779 filed on Jul. 29, 1997 and Hei 9-202780 filed on Jul. 29, 1997, the contents of which are incorporated herein by reference.

BACKGROUND OF THE INVENTION

1. Field of the Invention

The present invention relates to a wiper arm and a wiper device for wiping a windshield of a vehicle.

2. Description of the Related Art

A wiper device for wiping a windshield of a vehicle is generally equipped with two sets of wiper arms and wiper blades.

The wiper arm has an arm-head fixed to a pivot at an end thereof and rotatably connected to a retainer by a spindle at the other end thereof. A spring member is fixed between the arm-head and the retainer to press the retainer against the windshield surface to be wiped. An arm piece is fixed to the retainer at an end thereof. The arm piece has a generally U-shaped holder to hold the wiper blade.

The wiper blade is composed of a rubber blade and a plurality of holder levers for holding the rubber blade.

When the wiper device operates, the wiper arm and the wiper blade swings to wipe off rain drops on the windshield.

As shown in FIG. 12, retainer 82 of such a wiper arm has side walls forming a U-shape channel, and an open side thereof which faces the windshield surface. If retainer 82 is put in air flow S while the vehicle runs at a high speed, big noises or soughs may be generated. When retainer 82 is exposed to such high speed air flow S, Karlman's vortexes are generated at the rear of side wall 84 of retainer 82 located at the upstream side of the air flow S and also high frequency vibration called cavity tones or edge tones is generated as the vortexes hit the other side wall 86 located at the down stream. The cavity tones resonate inside the retainer 82 thereby generating big noises.

In order to prevent such big noises, JP-U-59-66652 proposes a retainer having a notch at the side wall located at the downstream side of the air flow. If high speed air flow hits the retainer to form vortexes, the vortex can not always hit the side wall located at the down stream side of the air flow. However, this structure can not eliminate the vortexes and, therefore, can not prevent the cavity tones completely.

SUMMARY OF THE INVENTION

The present invention has an object of providing a wiper arm and wiper device for a vehicle which is free from wind noises.

According to a main aspect of the present invention, a wiper arm for a vehicle windshield has an upper wall, a first side wall extending from one side of the upper wall, a second side wall extending from the other side of the upper wall and an open side disposed opposite the upper wall to face the windshield. In particular, the first side wall is located at an upstream side on the windshield relative to the second side wall, and the first side wall has a larger height from the upper wall than the second side wall.

Accordingly, when the vehicle runs at a high speed and wiper arm is put in high-speed air flow, the air flow is prevented from hitting the second side wall. That is, the cavity tones or big noises can be prevented.

According to another aspect of the invention, the upper wall, first side wall and second side wall are disposed to form a triangular channel which closes the open side facing the windshield.

Accordingly, when the vehicle runs at a high speed and wiper arm is put in high-speed air flow, the air flow is prevented from getting inside retainer 16 and guided by slanted first side wall to second side wall smoothly so that vortexes can not be generated in the rear of the first side wall. That is, the cavity tones or big noises can be prevented.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 2 is a plan view of the wiper arm according to the first embodiment;

FIG. 3 is a side view of the wiper arm according to the first embodiment;

Figure 1:
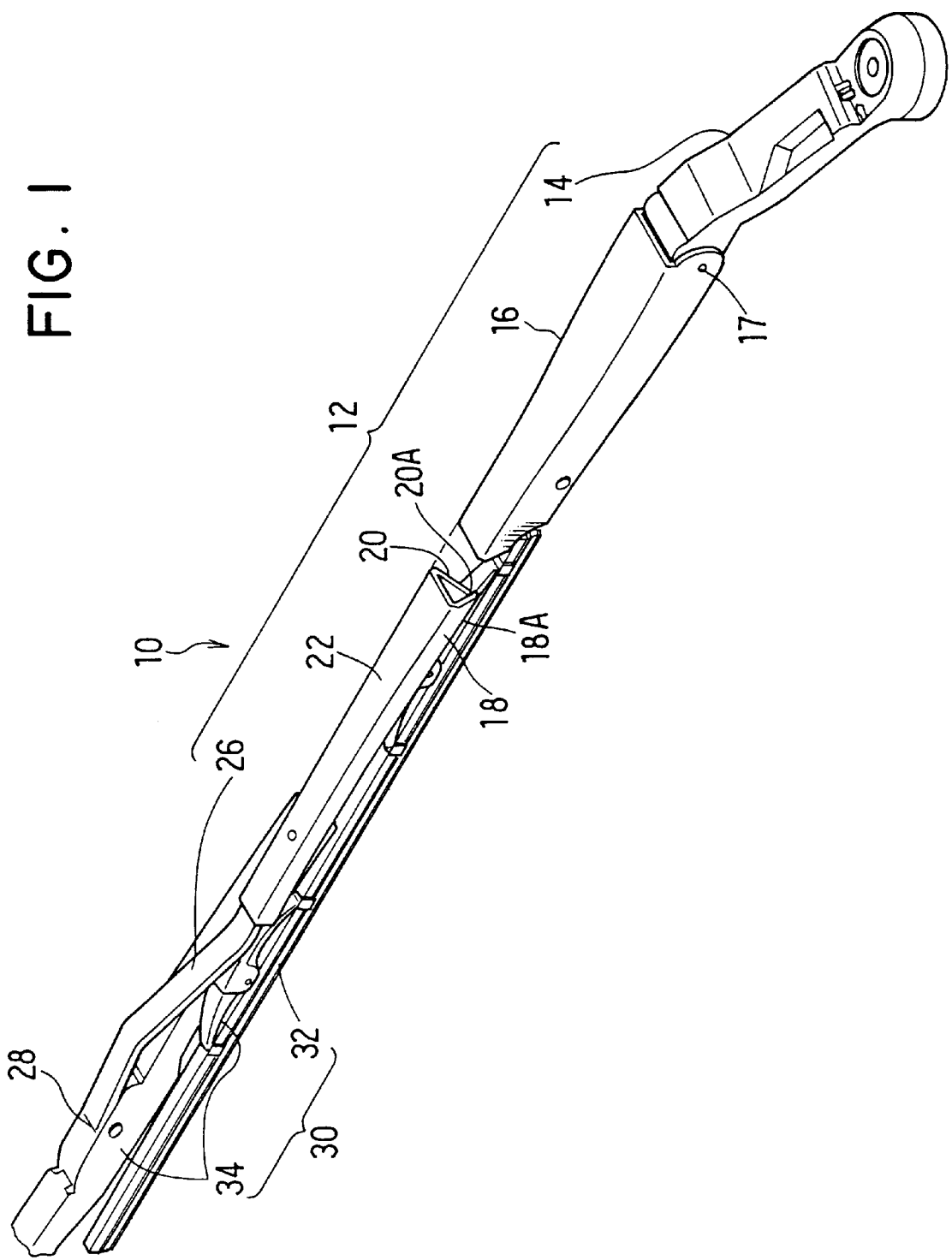
FIG. 1 is a perspective view of a wiper arm according to a first embodiment of the invention.
Figure 4:
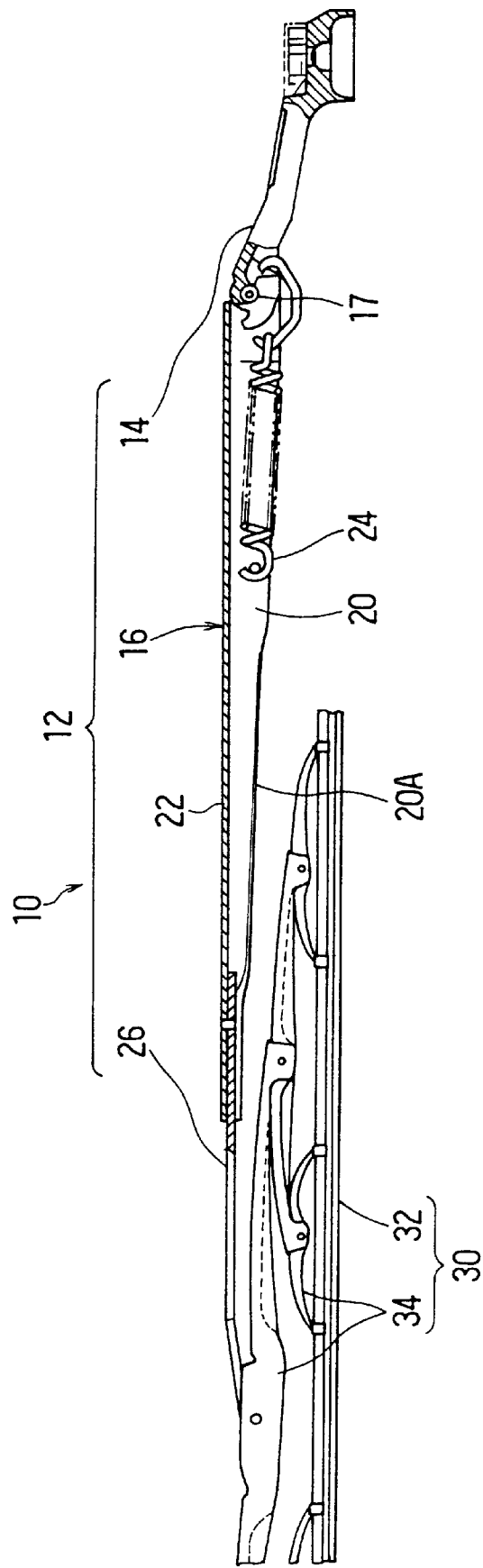
FIG. 4 is a cross-sectional side view of the wiper arm according to the first embodiment.

DETAILED DESCRIPTION OF THE PREFERRED EMBODIMENTS (First Embodiment)

A wiper arm according to a first embodiment of the invention is described with reference to FIGS. 1–6.

Wiper 10 is composed of wiper arm 12 and wiper blade 30 supported by wiper arm 12. Wiper arm 12 has arm head 14. Arm head 14 is fixed at an end to a pivot (not shown) mounted in a vehicle to be driven thereby and is connected at the other end thereof to retainer 16 to be rotatable about needle 17.

Figure 5A:
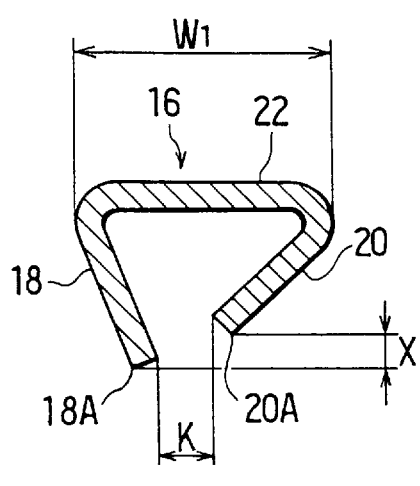
FIG. 5A is a cross-sectional view of a retainer of the wiper arm according to the first embodiment cut along line 5A—5A in FIG. 3.
Figure 5B:
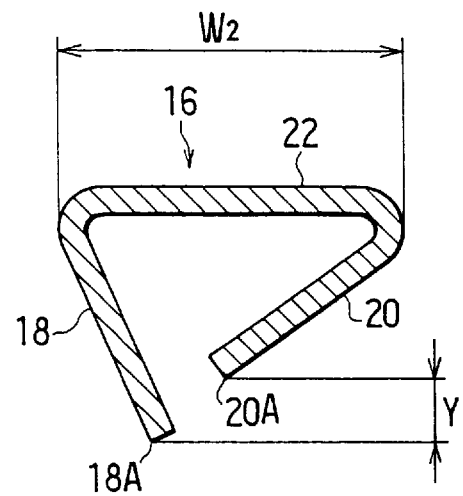
FIG. 5B is a cross-sectional view of the same retainer cut along line 5B—5B in FIG. 3
Figure 6:
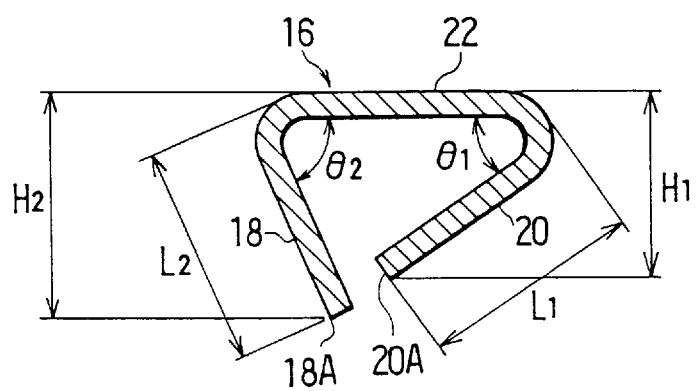
FIG. 6 is a cross-sectional view of the same retainer.

Retainer 16 has a pair of side walls 18, 20 formed opposite to each other and upper wall 22 formed between side walls 18, 20 so that retainer has one open side facing the windshield glass. Retainer 16 is generally tapered in the longitudinal direction thereof so that side walls 18, 20 become lower and upper wall 22 becomes narrower as a portion thereof near the tip thereof. As shown in FIGS. 5A, 5B and 6, the pair of side walls 18, 20 is bent to form a triangular channel so that edge portions 18A, 20A thereof come close to each other. Height H1 from upper wall 22 to edge portion 20A of side wall 20 to be located at the down stream side of the air flow is lower than height H2 from upper wall 22 to edge portion 18A of side wall 18 to be located at the upstream side of the air flow. That is, H1<H2.

Width L1 of side wall (downstream side wall) 20 is the same as width L2 of side wall (upstream side wall) 18. That is L1=L2. Angle θ1 formed between downstream side wall 20 and upper wall is smaller than angle θ2 formed between upstream side wall 18 and upper wall 22. That is, θ1<θ2.

As shown in FIG. 5A and FIG. 5B, the difference X in height between H1 and H2 at the tip portion of retainer 16 is 2 mm or more and smaller than the difference Y in height between H1 and H2 at the base portion of retainer 16. That is, X<Y.

Spring member 24 is fixed between retainer 16 and arm head 14 to press retainer against the windshield. Arm piece 26 is fixed to the tip of retainer 16, where side walls 18, 20 are bent to grasp an end of arm piece 26. Arm piece 26 has a U-shape holder 28 at the tip thereof to rotatably hold wiper blade 30 by a clip (not shown). Wiper blade 30 is composed of a rubber blade 32 and a plurality of holding levers 34.

Figure 5C:
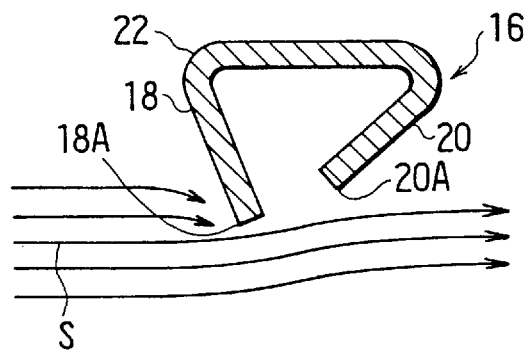
FIG. 5C is a cross-sectional view of the same retainer illustrating air flow around the retainer.

When wiper arm 12 and wiper blade 30 swing, rubber blade 32 slides on the windshield surface and wipes off rain drops. Even if the vehicle runs at a high speed and wiper arm 12 is put in high-speed air flow, the air flow is prevented from getting inside retainer 16 because of the above described structure having small opening K shown in FIG. 5A. High speed air flow is guided by slanted upstream side wall 18 to downstream side wall 20 smoothly as shown in FIG. 5C so that vortexes can not be generated in the rear of the upstream side wall 20. That is, the cavity tones or big noises can be prevented.

The relationship between the widths L1, L2 and the angles θ1, θ2 of side walls 20, 18 of retainer 16 according to the first embodiment can be changed as far as the height H1 of downstream side wall 20 is smaller than the height H2 of upstream side wall 18.

(Second Embodiment)

Figure 7A:
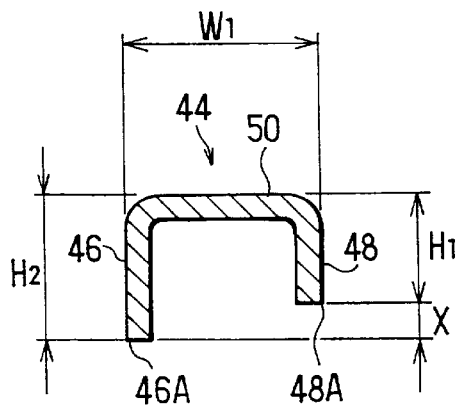
FIG. 7A is a cross-sectional view of a retainer according to a second embodiment at a portion corresponding to FIG. 5A
Figure 7B:
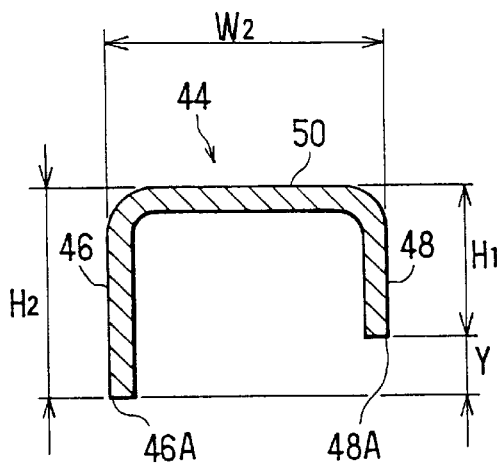
FIG. 7B is a cross-sectional view of the second embodiment corresponding to FIG. 5B.

Retainer 44 of wiper arm 42 according to a second embodiment of the present invention is described with reference to FIGS. 7A and 7B. Retainer 44 is composed of upstream side wall 46, downstream side wall 48 and upper wall 50, which form a U-shaped channel. Retainer 44 is generally tapered so that side walls 46, 48 become lower and upper wall 50 becomes narrower as a portion thereof near the tip thereof. Height H1 from upper wall 22 to edge portion 20A of downstream side wall 48 is lower than height H2 from upper wall 50 to edge portion 46A of upstream side wall 46. That is, H1<H2.

The difference X in height between H1 and H2 at the tip portion of retainer 16 is smaller than the difference Y in height between H1 and H2 at the base portion of retainer 16. That is, X<Y. Other portions are almost the same as those of the first embodiment.

Even if the vehicle runs at a high speed and wiper arm 42 is put in high-speed air flow, the air flow is prevented from hitting downstream side wall 48. That is, the cavity tones or big noises can be prevented.

(Third Embodiment)

Figure 8A:
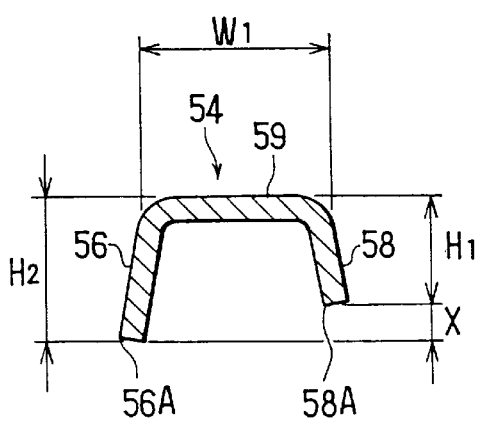
FIG. 8A is a cross-sectional view of a retainer according to a third embodiment at a portion corresponding to FIG. 5A
Figure 8B:
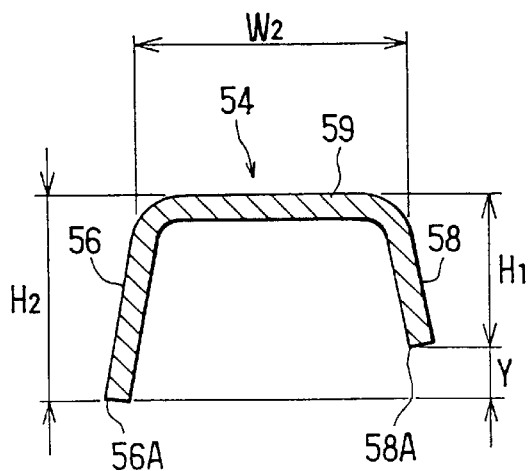
FIG. 8B is a cross-sectional view of the third embodiment corresponding to FIG. 5B.

Retainer 54 of wiper arm 52 according to a third embodiment of the present invention is described with reference to FIGS. 8A and 8B. Retainer 54 is composed of upstream side wall 56, downstream side wall 58 and upper wall 59, which form V-shape or dove-tail channel. Other portions are almost the same as those of the second embodiment.

Even if the vehicle runs at a high speed and wiper arm 42 is put in high-speed air flow, the air flow is prevented from hitting downstream side wall 58. That is, the cavity tones or big noises can be prevented.

(Other embodiments)

Figure 9:
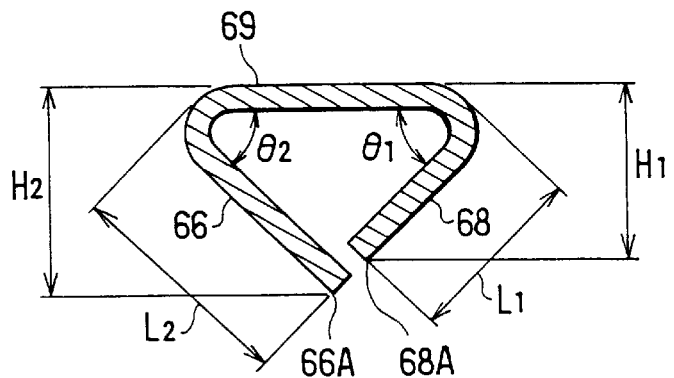
FIG. 9 is a cross-sectional view of a retainer according to one of other embodiments according to the invention.
Figure 10:
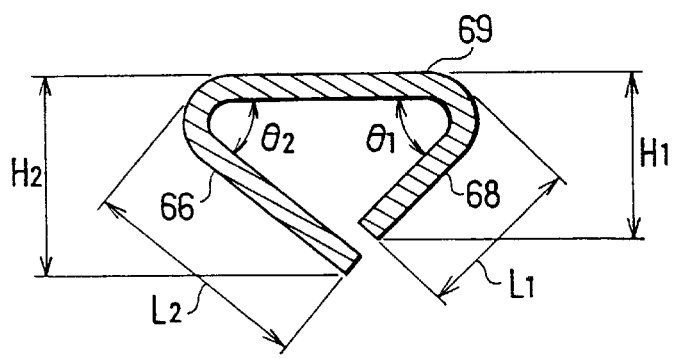
FIG. 10 is a cross-sectional view of a retainer according to another embodiment.

As shown in FIG. 9, retainer 64 is composed of upstream side wall 66, downstream side wall 68 and upper wall 69, which form triangular shape in cross section. Width L1 of downstream side wall 68 is smaller than width L2 of upstream side wall 68. That is L1<L2. Angle θ1 formed between downstream side wall 68 and upper wall 69 is the same as angle θ2 formed between upstream side wall 66 and upper wall 64. That is, θ1=θ2. However, angle θ1 can be made smaller than θ2, as shown in FIG. 10.

Other portions are almost the same as those of the first embodiment.

Figure 11:
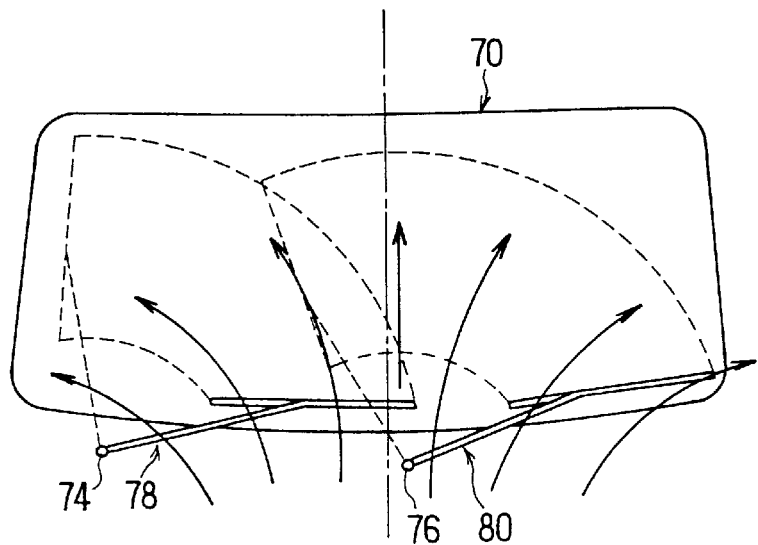
FIG. 11 is a schematic diagram illustrating an application of an embodiment of the invention.
Figure 12:
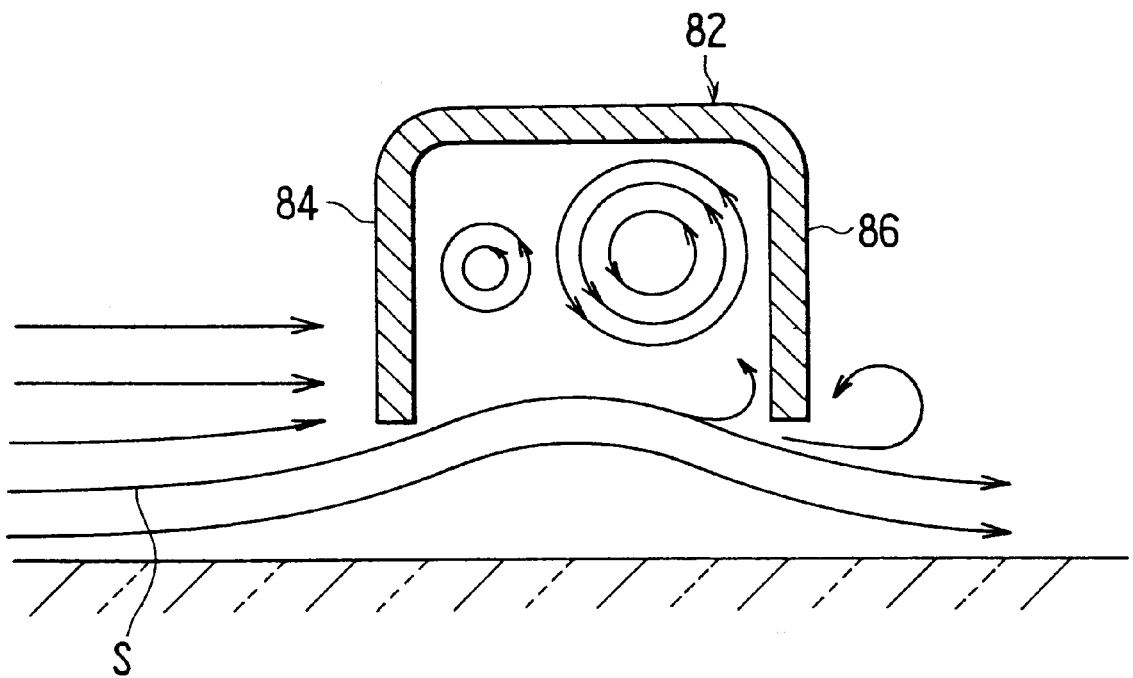
FIG. 12 is a schematic diagram of a retainer of a conventional wiper arm.

An application of the wiper arm according to one of the above embodiments is described with reference to FIG. 11.

Wiper device 70 is composed of wiper arm 78 connected to pivot 74 and wiper arm 70 connected to pivot 76. Wiper arm 80 is the wiper arms according to one of the above embodiments of the invention and is located at the center of the windshield where the strongest air flow hits the wiper arm. Thus, a conventional wiper arm can be used for wiper arm 78.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A wiper arm for a vehicle windshield having a wiper blade disposed at the tip thereof and connected at the base thereof to a rotating pivot extending from a vehicle body and a spring member for pressing said wiper blade against said windshield, said wiper arm having an upper wall, a first side wall extending from one side of said upper wall, a second side wall extending from the other side of said upper wall and an open side disposed opposite said upper wall to face said windshield, wherein said first side wall is located at an upstream side on said windshield relative to said second side wall, said first side wall has a larger height from said upper wall than said second side wall, and said upper wall, first side wall and second side wall from a triangular channel which closes said open side.

2. The wiper arm as claimed in claim 1, wherein an angle between said first side wall and said upper wall is larger than an angle between said second side wall and said upper wall.

3. The wiper arm as claimed in claim 2, a width of said first side wall is the same as a width of said second side wall.

4. The wiper arm as claimed in claim 1, wherein a difference in height between said first side wall and said second side wall at a portion of said wiper arm increases as said portion nears said base.

5. The wiper arm as claimed in claim 4, wherein the width of said upper wall at a portion of said wiper arm increases as said portion nears said base.

6. The wiper arm as claimed in claim 1, wherein the width of said first and second side walls at a portion of said wiper arm increases as said portion nears said base.

7. The wiper arm as claimed in claim 1 further comprising an arm head connected to said rotating pivot, a retainer pressed against said windshield by said spring member, and an arm piece fixed to said retainer for supporting said wiper blade.

8. The wiper arm as claimed in claim 7, wherein said retainer has a portion for grasping said arm piece by said first and second side walls.

9. The wiper arm as claimed in claim 1, wherein said wiper arm is located near a horizontal center of said windshield.

10. A wiper arm for a vehicle windshield including an arm head to be rotatably connected to a driving motor mounted in a vehicle, a spring member, a retainer pressed against said windshield by said spring member, a wiper blade supported by said retainer, wherein said retainer has a channeled structure tapering to said wiper blade and is composed of an upper wall, a first side wall extending from one side of said upper wall, a second side wall extending from the other side of said upper wall to be located at a downstream side on said windshield relative to said first side wall and an open side disposed opposite said upper wall to face said windshield, said first side wall has a larger height from said upper wall than said second side wall, and a difference in height between said first side wall and second side wall at a portion of said wiper arm increases as said portion nears said base.

11. The wiper arm as claimed in claim 10, wherein said upper wall, first side wall and second side wall are disposed to form a triangular channel which closes said open side.

12. The wiper arm as claimed in claim 11, a width of said first side wall is the same as a width of said second side wall.

13. The wiper arm as claimed in claim 10, wherein an angle between said first side wall and said upper wall is larger than an angle between said second side wall and said upper wall.

14. The wiper arm as claimed in claim 10, wherein said upper wall, first side wall and second side wall are disposed to form a U-shaped channel.

15. The wiper arm as claimed in claim 10, wherein the width of said upper wall at a portion of said wiper arm increases as said portion nears said base.

16. The wiper arm as claimed in claim 10 further comprising an arm head connected to said rotating pivot, a retainer pressed against said windshield by said spring member, and an arm piece fixed to said retainer for supporting said wiper blade.

17. The wiper arm as claimed in claim 16, wherein said retainer has a portion for grasping said arm piece by said first and second side walls.

\* \* \* \* \*